United States Patent Office 3,508,913
Patented Apr. 28, 1970

3,508,913
LEAD, TIN AND THEIR ALLOYS INCORPORATING ORGANO-SILICON
Ernest R. Boller, Southfield, Mich., assignor to Industrial Smelting Company, Detroit, Mich., a corporation of Michigan
No Drawing. Continuation-in-part of application Ser. No. 555,275, June 6, 1966. This application Apr. 17, 1969, Ser. No. 817,170
Int. Cl. C22c 11/00, 13/00
U.S. Cl. 75—134   11 Claims

ABSTRACT OF THE DISCLOSURE

The subject matter of this invention is a metal composition and method of manufacture. The composition comprises a metal selected from the group consisting of lead, tin and their alloys in which the sum of the lead and tin by weight is at least 75% of the weight of the metal and in which one or more organo-silicon compounds have been added. In addition, one or more polymeric materials selected from the group consisting of olefin type polymers, vinyl type polymers, allyl type polymers and polysulphide type compounds may be added.

---

This application is a continuation-in-part of Ser. No. 555,275 filed on June 6, 1966 and now abandoned.

This invention relates broadly to lead, tin and alloys of these metals with each other and with other metals. More specifically it concerns a metal selected from the group consisting of lead, tin and their alloys in which the sum of lead and tin amounts to at least 75% by weight of the metal. Still more specifically it refers to a metal from this group having an organo-silicon composition incorporated therein.

Within the past few years it has become increasingly apparent that the physical and mechanical properties of a metal are to a considerable extent a function of its crystal structure; and within limits the physical properties can be controlled by controlling the crystal structure. By crystal structure is meant both grain size and orientation, and internal dendritic structure of the grains. The importance of crystal structure applies to cast metals and to wrought metals produced therefrom. Considerable success has been achieved in upgrading physical properties of metals by rapid cooling, by directional cooling, by thermal or vibrational disintegration of first dendrites to form in a casting. Of greatest commercial importance is improvement of physical properties by production of uniformly small randomly oriented crystals.

In the case of lead, tin and their alloys, the control of crystal size and the improvement in physical properties which this permits is a matter of importance. Structural items, as tubing or sheathing, can be made stronger, or items of same strength can be made with less weight of metal. The plates in lead-acid storage batteries can be made thinner, with savings in weight and cost. Increased tensile strength and ductility can widen the applicability and improve the performance of lead-tin soft solders or for the same properties the proportion of tin can be decreased with consequent savings. The utility of lead-antimony alloys can be increased by greater ductility without loss of hardness or tensile strength. Also, there is need for a body solder having a crystal size sufficiently small and stable to permit easier and more economical application.

It is an object of this invention to provide lead, tin and their alloys having improved physical properties for a wide variety of uses.

It is another object of this invention to provide for the fine, uniform and stable dispersion in these metals of heterogeneities due to metallic second phases or to non-metallic inclusions.

It is another object of this invention to provide these metals with the control for crystal structure and heterogeneity dispersion incorporated in the metal, so that they can be melted and cast with minimum requirements for other treatments or controls to obtain optimum properties.

It is another object of this invention to provide a lead basis body solder which can be more easily and economically applied to automobile bodies than any heretofore available.

It is a further object of this invention to provide lead, tin and their alloys which have improved flowability in the casting operation, so that thinner sections, more intricate surfaces and smoother cast surfaces may be produced.

It is a further object of this invention to provide lead, tin and their alloys which possess greatly improved spreading and wetting properties on other metals, so that smooth and continuous hot-dipped coatings of these metals may be applied to other metals.

It is a still further object of this invention to provide at a reasonable cost a method for producing lead, tin and their alloys having the above characteristics.

I have found that these objectives can be achieved by incorporating in the lead, tin or alloys thereof a very small amount of an organo-silicon composition. One may add a single organo-silicon compound, a combination of two or more or a combination of one or more with other organic polymers or polymer forming compounds. A suitable procedure for adding the organo-silicon composition involves holding the metal at or slightly above its melting point, agitating to produce a good vortex, dropping the organo-silicon material into the vortex and continuing agitation until a dry dross is formed. The tendency of the less heat resistant organo-silicon compounds to burn on surface of molten metal can be suppressed by simultaneous addition of a chlorinated hydrocarbon, as perchlorethylene. Several other methods may be used for adding the organo-silicon material. It may be introduced as liquid or gas, beneath surface of agitated metal. Or it may be applied to surface of metal before melting.

All of the large number of organo-silicon compounds which were tried were found to reduce the crystal size of lead, tin and their alloys when incorporated into the metal. All were observed to be surface active when introduced into subject metals. In this specification the term organo-silicon compound is defined to include polysiloxanes, organo-chlorosilanes, organosilane esters and organo-functional silanes. Polysiloxanes, or silicones, have the general formula $R_3SiO(R_2SiO)_nSiR_3$, in which R represents organic groups all or most of which are hydrocarbon but some of which can be replaced with a wide variety of other organic groups. Organo-chlorosilanes have the general formula $R_xSiCl_{(4-x)}$. In organosilane esters the chlorine of the organochlorosilanes is replaced with an alkoxy group. Organofunctional silanes have general formula $R(CH_2)_nSiX_3$, in which R represents a reactive organic function attached through its terminal carbon to the silicon and X represents chlorine or an alkoxy group. A number of representative compounds which have been extensively examined are listed in Table I.

TABLE I

Representative organo-silicon compounds examined (1) Dimethylpolysiloxane, linear 60,000 centistokes viscosity at 25° C.
(2) Dimethylpolysiloxane, linear 10,000 centistokes viscosity at 25° C.

(3) Dimethylpolysiloxane, crosslinked, 2,000 centistokes viscosity at 25° C.
(4) No. 1 containing 1.5% benzoyl peroxide
(5) Methylphenylpolysiloxane, linear, 500 centistokes viscosity at 25° C.
(6) Diphenylethoxypolysiloxane, with equivalent weight of 800 per ethoxy group
(7) Dimethylpolysiloxane, linear, with about 1% of methyl groups replaced with beta-naphthol
(8) Copolymer of dimethylpolysiloxane and polyethylene-polypropylene oxide, containing about 35% siloxane
(9) Diphenyldichlorosilane
(10) Diphenyldiethoxysilane
(11) Vinyltriethoxysilane
(12) N(beta-aminoethyl) gamma - aminopropyltrimethoxysilane Other organo-silicon compounds which have been examined to lesser extent include dimethyldichlorosilane, ethyltrichlorosilane, phenyltrichlorosilane, ethyltriethoxysilane, dimethyldiethoxysilane, gamma-methacryloxypropyltrimethoxysilane, beta - (3,4 - epoxycyclohexyl) ethyltrimethoxysilane, gamma - glycidoxypropyltrimethoxysilane, methylvinylpolysiloxane, or silicone rubber gum, a quaternary organo-silicone. and several copolymers of dimethylpolysiloxane and polyalkylene oxide with various identities and proportions of polyalkylene oxide.

It is not known whether the organo-silicon compounds added to the molten metal are eventually present as such in the metal, or whether the active material in the metal is a reaction product of the added compound with itself, with one or more metals present, or with one or more of the metal oxides which are always present. Undoubtedly there is some thermal decomposition on contact with the hot metal, especially of less heat resistant compounds, but this seldom amounts to as much as 10% of compound added. It is surprising that a relatively volatile compound, as vinyltriethoxysilane, can be added with loss of less than 25% by volatilization. Probably it undergoes very rapid polymerization, and perhaps reaction, under these conditions. In some cases the polysiloxanes would be expected to polymerize further on contact with the molten metal through crosslinking. There is considerable evidence from surface properties of solid metal treated in this way that some portions of added polysiloxanes are present as such, especially with the more heat resistant ones, as phenylmethylpolysiloxane, methylamylpolysiloxane and dimethylpolysiloxane. Once dissolved in subject metal, the organo-silicon compositions are surprisingly heat resistant. Metal in which an organo-silicon compound had been incorporated has been held at 1100° to 1200° F. for 8 hours without significant loss of the organo-silicon material present. In any case this invention is concerned with the composition of matter resulting from addition of an organo-silicon compound to molten lead, tin and their alloys.

The amount of organo-silicon compound necessary to produce desired effect in the metal is quite small. In some cases the effect of the organo-silicon compound is discernable at a concentration of 0.0001%. Usually a concentration of at least 0.001% is required to produce a significant effect. In most instances the concentrations employed will range from 0.005% to 0.05%. Concentrations as high as 0.5% have been used. Some of the organo-silicon compounds cannot be used at concentrations above about 0.04 and 0.05%, since this appears to be the limit of their solubility in these metals. Generally the organo-silicon compounds which are more chemically and thermally inert are less soluble than those which are less stable.

Other procedures for reducing crystal size in these metals may be usd in conjunction with addition of an organo-silicon compound. One well known procedure is quick cooling of the molten metal. Another is mechanical working of the cast metal, as by rolling or extrusion. Another is vibration of the metal as it freezes, which may be readily accomplished by fastening a vibrator to the mold and vibrating at optimum frequency for specific metal being cast. Still another is seeding of the metal as it freezes, as by adding solid metal of same composition in such amount that it is partially melted and thus provides nuclei for metal crystallization. Still another is agitation of metal in mold during initial portion of solidification, as by swirling. When used along with addition of an organo-silicon composition, the effect of any of above external treatments, either alone or in any combination, may be additive to that of the organo-silicon composition. With an organo-silicon composition of moderate effectiveness, the effect of a combination of three or four external treatments is usually about equal to the effect of the organo-silicon. With organo-silicon compositions of higher effectiveness the effect of external treatments is less. With the most effective organosilicon compositions, the effect of the external treatments, with probable exception of quick cooling, is so small that it has little significance.

The simplest way to demonstrate the effect of an organo-silicon compound on crystal size of subject metals involves slowly cooling the molten metal, 30 min. from start to end of solidification, with slow mixing. The size and form of individual crystals and grains are noted with and without organo-silicon compound. Some representative observations are given in Table II, showing qualitatively the effect of various organo-silicon compounds in reducing crystal size with a range of subject metals. Comparable results were obtained by casting the molten metals of Table II with and without indicated addition agents into small bars and observing grain size at fractured sections.

TABLE II.—QUALITATIVE EFFECT OF ORGANO-SILICON COMPOUNDS

| Metal | Addition [1] | Crystal size | Crystal form |
| --- | --- | --- | --- |
| Tin | None | Large | Thick prisms. |
| Do | 0.13% "3" | Moderately large. | Some prisms, some thin needles. |
| Do | 0.03% "11" | Moderate | Do. |
| Do | 0.03% "6" | do | Thin needles, many curved. |
| Lead | None | Moderately large. | Cubes. |
| Do | 0.1% "3" | Moderate | Fairly thin needles. |
| Do | 0.1% "7" | Moderately small. | Thin needles. |
| Lead—50% tin | None | Small | Prisms. |
| Do | 0.01% "7" | Fine | Needles, mostly curved. |
| Pb—3.7% Sb | None | Small | Prisms. |
| Pb—3.7% Sb | {0.01% "3" / 0.01% "7"} | Fairly fine | Needles, mostly curved. |
| Pb—3.7% Sb—1.0% Sn | None | Small | Prisms. |
| Pb—3.7% Sn—1.0% Sn | {0.01% "3" / 0.01% "7"} | Fairly fine | Needles, many curved. |

[1] Numbers refer to organo-silicon compounds listed in Table I.

A quantitative measure on effect of an organo-silicon composition can be obtained by a rheological examination of the partially molten metal. This is also a useful testing procedure for evaluation of body solder, or filler solder, used in large amounts for filling cavities on automobile bodies.

Body solders are lead basis alloys containing from 3.5 to 7.0% antimony, 0.8% to 5% tin and 0% to 1% arsenic and balance lead. In this specification the term body solder is defined as an alloy having a composition generally within this range. The most commonly used body solder has the composition 5.2% antimony, 2.5% tin, 0.5% arsenic and balance lead. This alloy has a melting range, difference between solidus and liquidus temperatures, of about 70° F. This specific body solder is considered below in detail with regard to effects of organo-silicon compositions; but similar results were obtained with an alloy consisting of 4% antimony, 4% tin and balance lead, and with another alloy consisting of 5.2% antimony, 0.9% tin, 0.1% arsenic and balance lead.

The body solder is applied to the automobile body over that portion of its melting range in which it has plastic properties suitable for such application, soft enough to be worked into body cavities and firm enough to remain in place. The presence of these plastic properties means that the body solder as applied is a colloidal system, metal crystals dispersed in liquid metal.

The body solder is prepared for application by heating bars of the alloy till they soften and can be worked into a plastic mass, and continuing heating until the consistency of the mass is lowest at which it can be readily applied. Thus the size of metal crystals present in plastic mass depends on size of crystals present in original bars. It is to be expected that a uniformly fine crystal structure in solid solder will favor high colloidality, and hence high plastic properties, in the solder at working temperatures, and such has been found to be the case. A system of this nature can be characterized to advantage by rheological examination.

The rheological curve for a body solder at or near its working temperature shows that this is a true plastic system, in rheological meaning of the term, with a definite yield point. Comparison of curves for a solder at different temperatures and of different batches of solder show that the yield point is the most significant rheological property, the curves themselves being essentially parallel. This is consistent with practical use of the solder, as the yield point is a measure of the force which must be applied to the system to change it from a solid to a fluid.

By determining the yield points of a body solder over a temperature range and correlating these values with observations on maximum and minimum consistencies at which solder is applied on an automotive body production line, one can obtain a measure of the temperature range over which the solder is workable. The difference in degrees F. between temperature at which the solder had a yield point corresponding to highest workable consistency and temperature at which it has a yield corresponding to lowest workable consistency has been designated the working range of the solder. As indicated above, this value also serves as a measure of crystal size in plastic solder, the numerical relationship being inverse.

Actually the body solder alloy containing 2.5% tin is markedly thixotropic over all its working range, except usually for a few degrees near its minimum working temperature. Thus one obtains one yield point value when system has been at rest for a few minutes, which may be designated thixotropic yield point, "T"; and another value immediately after system has been vigorously stirred, which may be designated plastic yield point, "P." Obviously both yield points affect application properties and both must be considered. In this work a single value for yield point of a solder has been obtained by taking the square root of the product of the two values experimentally determined.

Another important property of a body solder is the temperature range between the point at which the metal softens perceptably and the minimum working temperature as defined above. Over this temperature range any attempt to work the metal results in its granulation. Therefore this temperature range has been designated the granulation range of the solder. In actual application of the body solder the temperature of the metal is falling and the operators frequently attempt to work it at temperatures below the minimum working temperature. If the granulation range is fairly large, they succeed in partially granulating the metal and produce a solder fill having a rough and porous surface. If this range is small, the metal passes through it before the metal can be granulated. In addition it seems that smallness of the granulation range is a measure of smallness of crystal size and of uniformity of crystal size.

The precise experimental procedure used for measuring the working range and granulation range of body solders may be described as follows:

Two procedures were used for preparation of test samples. In Procedure "A," the completely molten metal was cooled slowly, stirring slowly with a spatula over a period of 30 minutes from liquidus temperature to point at which metal was too stiff to be worked. In Procedure "B," bars of the solder metal were heated in test container and squished into a continuous mass as they softened. Additional bars were pushed in and squished as rapidly as heat input permitted until desired metal level was obtained. Temperature was not allowed to exceed minimum working temperature by more than 10° F. The plastic solder was worked with a spatula at frequent intervals.

The yield points for a solder were measured over a considerable temperature range and the working range derived from this data. The yield points were determined with a rotating type viscosimeter. A paddle type rotor was used, consisting of a rod ⅜ in. in diameter with two paddles attached near the bottom, paddles being rods ⅛ in. in diameter and ¾ in. long and fastened at right angles to central rod, spaced 180° apart and one located ⅜ in. above the other. The rotor was constructed of stainless steel. The gearing used for translating weight to torque on the rotor was that of a standard Stormer viscosimeter. Readings were taken as grams weight.

The solder sample was held in a No. 4 graphite crucible. A sample weight of 14½ to 15 lbs. was necessary to fill the crucible to ¼ in. from top at required temperatures. The top of the crucible was covered with aluminum coated steel, with necessary holes for thermocouple and viscosimeter rotor.

The crucible was held in an open top upright electric resistance furnace. The temperature of sample in crucible was regulated by a conventional controller through a thermocouple inserted into the sample, and the temperature was read from the indicating scale.

When metal was too stiff to work easily with a spatula, the viscosimeter rotor was inserted, with paddles on rotor being 1 in. below the surface of the metal. The sample was then allowed to cool to a temperature about 5° F. below solidus to insure complete freezing. As the solder cooled, the rotor was turned at frequent intervals until metal became so stiff that rotor could not be turned by hand.

The temperature of the sample was then raised quite slowly. At least 30 minutes was taken to cover the 5° to 10° F. to the minimum working temperature.

Most solder samples exhibited no thixotropy at or near the minimum working temperature. In this case the temperature was determined at which weight corresponding to maximum workable consistency would just cause a discernible movement of the rotor, this being the minimum working temperature. When thixotropy was present at minimum working temperature, it was necessary to determine the thixotropic yield point at a value considerably above the maximum yield point for workability in order that $(PT)^{1/2}$ would equal or exceed this maximum value. The thixotropic yield point was determined by ascertaining the weight on the instrument which would just cause a discernible movement of rotor, with sample being undisturbed for at least 20 to 30 seconds after any mixing. The plastic yield point was determined by ascertaining the weight which, after turning rotor 40 to 50 revolutions, would not quite keep rotor turning continuously. This determination was repeated once or twice to insure reaching a constant value. In latter case the minimum working temperature was obtained by interpolation. The presence of thixotropy at minimum working temperature was easily observed as this temperature was approached.

The temperature of sample was then raised, with readings on yield points being taken at 5° intervals. The sample was mixed thoroughly with a spatula about 30 seconds before each desired temperature was reached. When thixotropy was present, both thixotropic and plastic yield points were measured as described above. When thixotropy was absent, agitation of the sample had no effect and only one yield point measurement was obtained. Successive yield point readings were taken at 5° intervals until the $(PT)^{1/2}$ value was well below the minimum yield point value for workability. The maximum working temperature was obtained by interpolation. In raising the temperature of the sample by 5° increments, the controller was so adjusted and settings so made that temperature increase stopped or slowed at desired temperatures. At least 10 minutes was allowed for each 5° rise.

Extended observations on body solder application at several automotive body production lines indicated that maximum consistency at which the solder could be worked satisfactorily corresponded to a $(PT)^{1/2}$ value of 1410 gms., measured as described above. The minimum consistency at which the solder could be worked satisfactorily corresponded to a $(PT)^{1/2}$ value of 710 gm. Thus for any solder the minimum working temperature was that at which $(PT)^{1/2}=1410$ gms., the maximum working temperature was that at which $(PT)^{1/2}=710$ gms., and working range was difference between these two temperatures.

The granulation range was determined by an additional observation in the procedure outlined above for working range measurement. When the solder sample temperature was being raised slowly from below the solidus to the minimum working temperature, the temperature was observed at which a standard thin spatula blade could just be pushed into the solder without buckling. This temperature was termed softening temperature. The difference, in degrees F., between this temperature and the minimum working was the granulation range.

Using the above experimental procedure, the effects of a wide variety of organo-silicon composition on the 2½% tin body solder alloy were determined. Representative results were summarized in Table III. Procedure "A" was used for preparing test samples. With this procedure, the effect of the addition agent alone were measured and the effects of all external treatments, as quick cooling, mechanical working and vibration were excluded.

TABLE III.—EFFECT OF ORGANO-SILICON COMPOUNDS

| Experiment: | Organo-silicon added [1] | Amount added, percent of metal | Working range, ° F. | Granulation range, ° F. |
| --- | --- | --- | --- | --- |
| 1 | None | | 15.6 | 6.5 |
| 2 | "1" | 0.01 | 24.4 | 3.0 |
| 3 | "2" | 0.01 | 23.6 | 2.5 |
| 4 | "3" | 0.01 | 32.5 | 2.5 |
| 5 | "4" | 0.01 | 31.9 | 2.5 |
| 6 | "5" | 0.01 | 30.5 | 2.5 |
| 7 | {"1"—50%, "5"—50%} | 0.01 | 26.6 | 2.5 |
| 8 | "7" | 0.01 | 29.6 | 2.5 |
| 9 | "6" | 0.01 | 28.9 | 2.0 |
| 10 | "8" | 0.01 | 35.0 | 2.5 |
| 11 | "8" | 0.03 | 38.4 | 2.0 |
| 12 | "11" | 0.01 | 29.4 | 3.0 |
| 13 | "12" | 0.01 | 24.0 | 2.5 |

[1] Numbers from Table I.

It was found that all organo-silicon compounds improved the properties of this solder alloy. The extent of this improvement depended on identity of the specific compound added, and upon amount added. It will be noted that in case of dimethyl silicone the effectiveness of the agent was increased by crosslinking of the silicone chains, comparison of Expt. 4 with Expts. 2 and 3 in Table III. It is known that an organic peroxide will promote splitting off of methyl groups in dimethyl silicone at high temperatures with consequent crosslinking, and this was confirmed in Expt. 5. Silicones "6," "7" and "8" are dimethyl silicones with moderately reactive groups replacing some methyl groups, and would be expected to crosslink at temperature of the molten metal, Expts. 8 to 11. When whole polymerization was carried out in situ by addition of a silane to the molten metal, it was to be expected that a high degree of crosslinking would result, especially if the organic group or groups attached by C—Si linkage were reactive, as in Expt. 12. However, if the organo-silicon compound was too highly polymerized, as with a silicone rubber, or polymerized too rapidly, as with the silicone rubber gums, it dissolved in the molten metal extremely slowly and with undue loss by thermal decomposition and by incorporation in the dross.

It was also discovered that a number of organic polymers, or compounds which would polymerize at temperature of these molten metals, added in combination with an organo-silicon composition would still further improve the properties of the subject metals. Representative results with the 2½% tin body solder alloy are summarized in Table IV for polyethylene, polyvinyl alcohol and a polysulphide type resin polymerized in situ. Experimental procedures were same as those described for Table III.

TABLE IV.—EFFECT OF ORGANO-SILICON COMPOUNDS COMBINED WITH OTHER POLYMERIC MATERIALS

| Experiment: | Additive [1] | Amount added, percent of metal | Working range, ° F. | Granulation range, ° F. |
| --- | --- | --- | --- | --- |
| 1 | None | | 15.6 | 6.5 |
| 2 | {"1", Polyethylene} | 0.01, 0.001 | 31.3 | 2.5 |
| 3 | {"5", Polyethylene} | 0.01, 0.001 | 33.5 | 2.5 |
| 4 | {"8", Polyethylene} | 0.02, 0.01 | 40.0 | 3.0 |
| 5 | {"8", "11", Polyethylene} | 0.02, 0.005, 0.01 | 40.7 | 1.5 |
| 6 | {"11", Polyvinyl alcohol} | 0.01, 0.01 | 32.8 | 2.0 |
| 7 | {"8", "11", Polyvinyl alcohol} | 0.02, 0.005, 0.015 | 41.2 | 2.0 |
| 8 | {"11", Na₂S₄·9H₂O, CCl₂:CCl₂} | 0.01, 0.02, 0.01 | 35.5 | 2.0 |
| 9 | {"8", "11", Na₂S₄·9H₂O, CCl₂:CCl₂} | 0.02, 0.01, 0.02, 0.01 | 36.5 | 3.0 |

[1] Numbers refer to organo-silicon compounds listed in Table I.

In case of polysulphide material, comparable results were obtained on substituting trichlorethylene, trichlorethane or ethyl chloride for the perchlorethylene; or on substituting phosphorous pentasulphide or a combination of elemental sulphur and phosphorous for the sodium sulphide. Among other polymers or polymer-forming materials which gave significant positive results were methylmethacrylate monomer, vinyl acetate polymer, diallylphthallate monomer, polypropylene, styrene monomer. When added alone to this molten metal in proportions on order of those shown in Table IV, these polymeric or polymer-forming materials dissolved only slightly or not at all. In admixture with organo-silicon compounds they appeared to dissolve in the molten metal quite readily with no excessive loss by thermal decomposition or by volatilization.

In other tests the 2½% tin body solder containing an organo-silicon composition was extruded into bars by the procedure normally used for producing body solder. This involved first casting the metal into billets, 5 in. in diameter and 16 in. long. The cooling rate was moderate, about 2 min., for complete solidification. During the casting operation the molds could be vibrated as the metal solidified, and the metal could be seeded by adding proper amount of solid metal of same composition as soon as molds were filled. This permitted evaluation of these two external methods for improving crystal structure of the solder metal. The top 4 in. of the billets were cropped to remove sink hole and underlying porosity. These billets were cold extruded to ¼ in. by ⅜ in. bar. An organo-silicon compound was used as lubricant in extrusion operation, this providing a second method for introducing this material into the solder metal. Apparently the lubricant was mixed with the metal to a considerable extent by flow of metal in extrusion chamber. A 10% weight solution of the organo-silicon compound in perchloroethylene was painted on sides of billets, the amount of organo-silicon compound thus added amounting to approximately 0.001% of weight of metal. The solvent evaporated within a few minutes. Conventionally, a palm oil or a mineral oil lubricant is wiped on sides of billets or on inside of extrusion chamber. In addition, it was found that use of a silicone lubricant in place of palm oil reduced extrusion pressure by at least 10%.

Some representative results obtained under these conditions are summarized in Table V. The values for working range and granulation range measure the sum of the effects due to organo-silicon addition to molten metal, to the lubricant, to the mechanical working of extrusion operation, and to the vibration and seeding procedures when they were used. As discussed above, the values for working range and granulation range provide a quantitative measure not only for suitability of the metal as body solder but also of improvement in crystal structure of the solder bars.

in reducing crystal size as measured by above procedure. The effect of quick cooling of the molten metal remained, but was in all cases of less magnitude than in absence of polysulphide materials from the organo-silicon composition.

The 2½% tin body solder alloy had a tendency to supercool in actual use, or when a test sample was prepared by procedures described above. With the unmodified alloy the supercooling usually amounted to about 1° F. With an organo-silicon compound addition it amounted to 1.5° to 2.5°. With a combination of organo-silicon compounds and a polysulphide type resin it amounted to 5° to 6°. Since the body solder cools as it is being applied, the actual working range would be the value given in Table V plus the supercooling with the specific agent used.

When unmodified 2½% tin body solder was heated to working range temperature, frozen and reheated, the solid metal crystals were so large that the metal did not have required plastic properties. This treatment significantly decreased the working range and increased the granulation range as measured by procedure described above. With the same alloy in which an organo-silicon composi- TABLE V.—PROPERTIES OF EXTRUDED BODY SOLDER WITH VARIOUS ORGANO-SILICON ADDITIONS

| Experiment: | Addition [1,2] | Amount added, percent of metal | Vibration | Seeding | Lube [1] | Working Range, °F. | Granulation range, °F. |
|---|---|---|---|---|---|---|---|
| 1 | None | | No | No | Palmoil | 17.4 | 4.5 |
| 2 | "1" | 0.01 | No | No | do | 23.6 | 4.0 |
| 3 | "1" | 0.01 | No | No | "1" | 28.2 | 3.0 |
| 4 | "1" | 0.01 | Yes | No | "1" | 33.5 | 2.5 |
| 5 | "1" | 0.01 | Yes | Yes | "1" | 37.9 | 2.0 |
| 6 | "1" | 0.01 | Yes | Yes | Mineral oil | 34.0 | 4.5 |
| 7 | "4" | 0.015 | Yes | Yes | "1" | 42.2 | 2.5 |
| 8 | "4" | 0.015 | Yes | Yes | "7" | 36.9 | 2.0 |
| 9 | "4" | 0.015 | Yes | Yes | "8" | 39.1 | 2.5 |
| 10 | "4" / "3" | 0.01 / 0.005 | Yes | Yes | "7" | 34.8 | 2.0 |
| 11 | "4" / "6" | 0.01 / 0.005 | Yes | Yes | "7" | 39.9 | 2.5 |
| 12 | "1" / "7" | 0.005 / 0.005 | Yes | Yes | "8" | 41.0 | 2.0 |
| 13 | "4" / "7" | 0.010 / 0.005 | Yes | Yes | "7" | 41.9 | 2.5 |
| 14 | "8" | 0.03 | Yes | Yes | "8" | 43.0 | 3.0 |
| 15 | "A" [3] | 0.02 | Yes | Yes | "8" | 43.6 | 1.5 |
| 16 | "7" | 0.01 | Yes | Yes | "8" | 41.2 | 2.0 |
| 17 | "7" | 0.01 | Yes | No | "8" | 37.9 | 3.0 |
| 18 | "7" | 0.01 | No | Yes | "8" | 36.9 | 2.5 |
| 19 | "7" | 0.01 | No | No | "8" | 34.4 | 3.5 |
| 20 | "C" [4] | 0.02 | Yes | Yes | "8" | 41.3 | 1.5 |
| 21 | "C" | 0.02 | Yes | No | "8" | 41.6 | 1.5 |
| 22 | "C" | 0.02 | No | Yes | "8" | 41.4 | 1.5 |
| 23 | "C" | 0.02 | No | No | "8" | 41.1 | 2.0 |
| 24 | "O" [5] | 0.02 | No | No | "8" | 47.5 | 0.5 |
| 25 | "N" [6] | 0.02 | No | No | "8" | 47.0 | 0.5 |
| 26 | "M" [7] | 0.02 | No | No | "8" | 48.0 | 0.5 |

[1] Numbers refer to organo-silicon compounds from Table I.
[2] All agents indicated contain in addition an amount of polyethylene equivalent to 0.001% of metal, representing weight of container in which agent was added.
[3] Agent "A" consisted of 4 parts of "8," 1 part of "11" 2 parts of polyethylene and 1 part diallylphthallate.
[4] Agent "C" consisted of 10 parts of "7," 5 parts of CCl₂:CCl₂, 2 parts of S and 1 part of P, partially reacted by digesting at 200° F. for 1 hour.
[5] Agent "O" consisted of 10 parts of "7," 2 parts of "8," 5 parts of CCl₂:CCl₂, 4 parts of P₂S₅ and 1 part P, partially reacted by digesting at 175° F. for 1 hour.
[6] Agent "N" consisted of 10 parts of "7," 2 parts of "8," 5 parts of CCl₂:CCl₂, 3 parts of S and 2 parts of P, partially reacted by digesting at 230-240° F. for 1 hour.
[7] Agent "M" consisted of 10 parts of "7," 2 parts of "8," 5 parts of CCl₂:CCl₂, 3 parts of S, 2 parts of P and 1 part of polyethylene, partially reacted by digesting at 230-240° F. for 1 hour.

Examination of data given in Table V, and comparison with Tables III and IV, shows that when organo-silicon compounds alone were added to the molten metal, the improvement in properties due to the lubricant, to mechanical working, to vibration and to seeding were, individually and collectively, additive to improvement caused by incorporation of these agents in the molten metal. With the addition agents comprising one or more organo-silicon compounds in combination with a polysulphide type polymer, such external treatments as vibration and seeding had no significant effect on crystal size in the metal. It was also found that with the more effective of these combination agents the effect of mechanical working was of diminishing importance. With a body solder alloy of lower tin and arsenic content than the one covered above, the addition agent comprised of organo-silicon compounds and a polysulphide type resin practically eliminated the effect of mechanical working tion had been incorporated, the plastic metal was frozen and reheated three times without appreciable change in plastic properties. There was no significant change in working range or granulation range. In another test a quantity of the metal was held at its maximum working temperature with slow stirring. The unmodified metal became sandy within 2 to 4 minutes, due to a crystal growth. With organo-silicon composition "M," Table V, present, crystal growth was barely detectable after 15 minutes and became significant only after 30 minutes. These observations showed effectiveness of an organo-silicon composition in inhibiting growth of large metal crystals at expense of small ones under these conditions.

The data given above for the alloy consisting of 5.2% antimony, 2.5% tin, 0.5% arsenic and the remainder lead showed that incorporation of an organo-silicon composition in the metal was very effective in reducing crystal size in the metal. Consequently there was a marked improvement in those properties which are desirable in a body solder.

Other tests were made to measure mechanical properties of solid metal to which an organo-silicon composition had been added to metal in molten state. The properties measured included tensile strength, elongation and hardness. For tensile and elongation, 1 in. diameter bars were chill cast and machined to standard tension test specimens with gage length of 2,000 in. and diameter of 0.500 in., as specified in ASTM method E8–66, FIG. 9. Small buttons were chill cast for Brinell hardness test, and test made with 10 mm. ball and 100 kg. load. In all cases control tests were run on unmodified metal cast by procedure identical to that for modified metal, since with these metals the mechanical properties are considerably influenced by casting procedure.

The effects of organo-silicon additions to some representative metals selected from subject group are summarized in Table VI:

As another example, 0.22% copper was introduced into lead, which had previously been treated with 0.05% of organo-silicon composition "10," Table I, at a temperature 5° to 10° F. above the melting point of the lead. There was no separation of copper crystals, and the dispersion was sufficiently stable that metal could be frozen, heated to 50° F. above the melting point and this cycle repeated several times with no separation of copper crystals. The solubility of copper in liquid lead at melting point is about 0.05%. In absence of organo-silicon compound, copper in excess of this value separated and floated on top of the lead. Evidently the organo-silicon composition inhibited the growth of copper crystals beyond colloidal dimensions and stabilized the dispersion of these very small crystals in the liquid lead.

These observations show the value of the organo-silicon addition in minimizing heterogeneities in the metal. They also indicate a method for preparing a dispersion strengthened metal of subject group which can be melted

TABLE VI.—EFFECT OF ORGANO-SILICON COMPOSITIONS ON MECHANICAL PROPERTIES

| Metal | Addition agent [1] | Amount, percent of metal | Yield strength, p.s.i. | Ultimate tensile strength, p.s.i. | Elongation, percent | Brinell hardness |
|---|---|---|---|---|---|---|
| Pb—5.2% Sb; 2.5% Sn; 0.5% As | None | | 6,200 | 7,700 | 2 | 14.5 |
| Pb—5.2% Sb; 2.5% Sn; 0.5% As | "7" | 0.05 | 8,500 | 9,200 | 2 | 15.9 |
|  | "M" | 0.05 | 7,100 | 9,400 | 2 | 13.2 |
| Pb—15% Sn | None | | 2,200 | 3,300 | 6 | 9.8 |
|  | "7" | 0.05 | 2,400 | 4,200 | 18 | 9.8 |
|  | "M" | 0.05 | 2,600 | 4,900 | 33 | 13.2 |
| Pb—4% Sb | None | | 3,200 | 5,700 | 12 | 11.0 |
|  | "7" | 0.05 | 3,200 | 5,700 | 20 | 10.6 |
|  | "M" | 0.05 | 4,000 | 5,900 | 21 | 11.6 |
|  | "10" | 0.05 | 2,500 | 5,500 | 41 | 10.6 |
| Pb—15% Sb; 1% Sn; 1% As | None | | 7,000 | 9,000 | 2 | 21.2 |
|  | "M" | 0.05 | 6,700 | 9,000 | 2 | 13.2 |
|  | "10" | 0.05 | 8,000 | 9,700 | 1 | 22.7 |

[1] Numbers refer to organo-silicon compounds from Table I. Letters refer to organo-silicon combinations from Table V.

It will be noted that addition of either organo-silicon composition "7" or "M" to the body solder alloy produced a significant increase in both yield and ultimate tensile strength. With the 15% tin-lead soft solder there were very appreciable improvements both in ultimate tensile strength and elongation with addition of the two organo-silicon compositions. Such improved mechanical properties increase the utility of soft solder as a joining metal, as, for example, in soldering automobile radiators and other sheet-metal heat exchangers. With the 4% antimonial lead, organo-silicon composition "M" significantly improved yield strength and all three compositions improved elongation. Such changes in mechanical properties produced by incorporation of an organo-silicon composition would be expected from the crystal structure refinement of subject metals as shown in preceding discussion.

It was also discovered that incorporation of an organo-silicon composition in molten metal of subject group made it possible to obtain a stable dispersion of a number of materials insoluble in the molten metal. For example, oxygen was blown through the modified metal from Experiments 2 and 13 in Table III, with the metal being held 100° F. above the liquidus temperature and vigorously agitated. The amount of dross formed on the metal was that normal for this temperature, time and agitation, no excess being formed by the oxygen. In the first case the working range was raised from 24.4 to 25.6 and in the second case from 24.0 to 27.3. Evidently the metal oxide formed by the oxygen was dispersed by the organo-silicon compound as it was formed, and in sufficiently small particle size that it contributed to working range in same manner as small metal crystals. The dispersion was sufficiently stable that the oxide particles did not coalesce to form dross. This metal was frozen and remelted without formation of any excess dross and without appreciably affecting the working range. Comparable results were obtained on blowing steam through similarly treated metal.

without destroying the dispersion and the added strength due to it. This has not heretofore been possible.

It was found that the castability of metals in subject group was improved by addition of an organo-silicon composition. In the first instance, presence of the organo-silicon composition increased the flowability of the liquid metal as it filled the mold. Flowability in this connection is apparently a function of viscosity of the liquid metal and of the various interfacial tensions involved. At low concentration used it would not be expected that the organo-silicon composition would have any appreciable effect on viscosity of the liquid metal. But it did markedly lower the surface tension and, apparently, interfacial tensions with mold materials. Because of this, castings of thinner cross section and with more intricate surface detail could be produced from subject metals when an organo-silicon composition was incorporated in them. Addition of an organo-silicon composition also improved smoothness of the cast surfaces. Again this evidently was result of lowered interfacial tensions. For example, a small balance wheel cast from alloy consisting of 12% antimony, 2% tin and remainder lead in a permanent steel mold showed laps and surface cavities due to non-displacement of air at all combination of alloy pouring temperatures and mold temperatures. Incorporation of 0.02% organo-silicon compound "10," Table I, in the alloy eliminated laps and surface cavities and allowed production of a very smooth, bright surface over a considerable range of pouring temperatures and mold temperatures.

A special case of casting lead, tin and their alloys is represented by hot-dip coating of other metal with subject metals. The beneficial effects of adding an organo-silicon composition were equally apparent in this application. The tendency of these coating metals, especially with heavy coatings, to form lumps and ridges was greatly minimized. The improved flowability, or spreadability, of the modified coating metals practically eliminated the incidence of pin-holes. Carbon steel, copper and brass have been hot-dip coated with 1 mil coatings of lead and several lead-tin alloys in which 0.02% of organo-silicon compound "7," Table I, was incorporated, the coatings being very smooth and uniform, free of pin holes and easily applied.

The mechanism by which an organo-silicon compound, either alone or in combination with other organic polymeric materials, refines the crystal structure of lead, tin and their alloys when incorporated therein is not known. It is known that, when an organo-silicon compound is added to such molten metal, it behaves as a surface active material. The angle of contact between the liquid metal and the container changes markedly as an organo-silicon compound is added. As noted above, this surface activity accounts for the improvement in the casting properties of these metals attributable to addition of an organo-silicon composition.

It is quite possible that refinement in crystal size of these metals is also due to this surface activity. It is well known that a surface active material in a liquid is concentrated at surfaces of the liquid. Thus as these metals cool, the organo-silicon composition in the metal would be concentrated at the crystal-liquid metal interface. It might be adsorbed on the solid surface, or it might remain in the liquid. In any case it would inhibit continued growth of the crystal. This would force formation of additional crystals, and thus result in smaller crystal size. This hypothesis is supported by fact, as previously noted, that when these metals are held in partially molten state or are frozen and partially remelted the presence of an organo-silicon compound greatly reduces the growth of large crystals at expense of small crystals.

Another possible explanation for effect of organo-silicon compositions on crystal structure of lead, tin and their alloys is that it provides a greater number of nuclei for crystal formation. It can be postulated that some metal oxide particles, which are always present to some extent in the metal, are stabilized by the organo-silicon composition at the size necessary for their acting as nuclei. These oxides are known to be excellent nucleating materials; and the ability of organo-silicon composition to stabilize such oxides was noted above. It is also possible that the organo-silicon compositions, particularly if they combine to some extent with the metal, could themselves constitute crystallization nuclei.

It is not intended that this invention be limited in any way by above hypothesis. The objectives set forth are achieved by incorporation of an organo-silicon composition in subject metals.

The embodiments of the invention in which an exclusive property or privilege is claimed are defined as follows:

1. A metal selected from the group consisting of lead, tin and their alloys in which the combined weight of the lead and tin is at least 75% of the weight of the metal and in which organo-silicon compound has been incorporated in an amount effective to alter the crystal structure of said metal.

2. A metal as defined by claim 1 additionally including at least one polymeric material selected from the group consisting of olefin type polymers, vinyl type polymers, allyl type polymers and polysulphide type compounds.

3. A metal as defined by claim 1 wherein said metal is selected from the group of lead and lead alloys.

4. A metal as defined by claim 1 wherein said metal is a body solder.

5. A metal as defined by claim 3 additionally incorporating at least one polymeric material selected from the group consisting of olefin type polymers, vinyl type polymers, allyl type polymers and polysulphide type compounds.

6. A metal as defined by claim 4 additionally incorporating at least one polymeric material selected from the group consisting of olefin polymers, vinyl type polymers, allyl type polymers and polysulphide type compounds.

7. A metal as defined in claim 1 wherein said organo-silicon compound is cross-linked.

8. A metal as defined in claim 1 wherein said organo-silicon compound is a dimethylpolysiloxane in which some of the methyl groups are replaced with more reactive organic groups.

9. A metal as defined in claim 1 wherein said organo-silicon compound consists at least partially of a copolymer of dimethylpolysiloxane and a polyalkylene oxide.

10. A metal having heterogenities stably dispersed therein selected from the group consisting of lead, tin and their alloys in which the combined weight of the lead and tin is at least 75% of the weight of the metal and in which organo-silicon compound has been incorporated in an amount effective to alter the crystal structure of said metal, and wherein said heterogeneities remain insoluble when said metal is liquified.

11. A body solder having incorporated therein organo-silicon compound, said body solder having metallic crystals sufficiently small to produce a working range in excess of 28° F. and a granulation range not greater than 4° F.

References Cited

UNITED STATES PATENTS

| 500,125 | 6/1893 | Guttner | 75—166 |
| 1,326,971 | 1/1920 | Salm | 75—175 |
| 2,159,982 | 5/1939 | Bullock | 75—166 |
| 2,972,551 | 2/1961 | Fringhian | 117—131 |
| 3,023,393 | 2/1962 | Oliver | 75—134 |
| 3,087,813 | 4/1963 | Veno et al. | 75—175 |
| 3,197,862 | 8/1965 | Harvey | 75—166 |

L. DEWAYNE RUTLEDGE, Primary Examiner

G. K. WHITE, Assistant Examiner

U.S. Cl. X.R.

75—166, 175